United States Patent [19]

Yamaura

[11] Patent Number: 5,809,405
[45] Date of Patent: Sep. 15, 1998

[54] TRANSMITTER/RECEIVER APPARTUS WITH REDUCED INSERTION LOSS COMPRISING A SINGLE SWITCHING MEANS AND A PLURALITY OF ANTENNA DUPLEXERS EACH DUPLEXER HAVING A DIFFERENT FREQUENCY BAND

[75] Inventor: Tomoya Yamaura, Tokyo, Japan

[73] Assignee: Sony Corporation, Tokyo, Japan

[21] Appl. No.: 630,780

[22] Filed: Apr. 10, 1996

[30] Foreign Application Priority Data

Apr. 19, 1995 [JP] Japan .................................. 7-093397

[51] Int. Cl.$^6$ .............................. H03C 7/02; J04B 1/02; J04B 7/02; J04B 1/46
[52] U.S. Cl. ......................... 455/101; 333/101; 455/553; 455/82; 455/83; 455/275
[58] Field of Search .............................. 455/101, 78, 82, 455/83, 275, 277.1, 552, 553; 370/280; 333/101, 126, 129, 134

[56] References Cited

U.S. PATENT DOCUMENTS

| | | | |
|---|---|---|---|
| 3,772,689 | 11/1973 | Root, Jr. | 343/5 |
| 4,766,437 | 8/1988 | Schmidt et al. | 342/368 |
| 5,054,115 | 10/1991 | Sawa et al. | 455/89 |
| 5,095,541 | 3/1992 | Aisaka et al. | 455/89 |
| 5,203,018 | 4/1993 | Hirose | 455/61 |
| 5,239,690 | 8/1993 | Heinonen | 455/89 |
| 5,261,121 | 11/1993 | Hashimoto | 455/89 |
| 5,369,801 | 11/1994 | Smith | 455/277.1 |
| 5,483,667 | 1/1996 | Faruque | 455/33.1 |
| 5,548,836 | 8/1996 | Taromaru | 455/277.1 |
| 5,598,404 | 1/1997 | Hayashi et al. | 370/342 |
| 5,613,219 | 3/1997 | Vogel et al. | 455/78 |

Primary Examiner—Tommy P. Chin
Assistant Examiner—David R. Vincent
Attorney, Agent, or Firm—Jay H. Maioli

[57] ABSTRACT

A transmitter/receiver apparatus employed with advantage in a radio communication system for radio transmission and reception of frequency division multiplexed or time-division multiplexed signals of the frequency division duplex system on switching between plural antennas includes a plurality of antennas for radio transmission/reception of the reception and transmission signals, a switch for switching between the antennas, a plurality of antenna duplexers connected to the antennas via the switch and having respective different frequency bands, a transmission unit connected to the antenna duplexers, a reception unit connected to the antenna duplexers and a control unit for controlling the switch, transmission unit and the reception unit. The control unit controls the switch so that an optional one of the antennas will be connected to the antenna duplexers of the frequency band corresponding to the frequency used in radio communication solely by the switching. The control unit controls the reception unit during reception for receiving reception signals via the antenna duplexers from the optional antenna, while controlling the transmission unit during transmission for transmitting transmission signals of the frequency used for radio transmission via the antenna duplexers from the optional antenna.

8 Claims, 6 Drawing Sheets

TRANSMITTER/RECEIVER APPARTUS WITH REDUCED INSERTION LOSS COMPRISING A SINGLE SWITCHING MEANS AND A PLURALITY OF ANTENNA DUPLEXERS EACH DUPLEXER HAVING A DIFFERENT FREQUENCY BAND

BACKGROUND OF THE INVENTION

1. Field of the Invention

This invention relates to a transmitter/receiver apparatus which may be employed with advantage in a radio communication system for radio transmission and reception of frequency division multiplexed or time-division multiplexed signals of the frequency division duplex system when switching between plural antennas.

2. Description of the Related Art

In general, in a transmitter/receiver apparatus, employed in a radio communication system such as frequency division duplex system (FDD), transmission signals and reception signals are separated from each other by a sole antenna duplex made up of a reception filter and a transmission filter. In many of the transmitter/receivers, transmission/reception is effectuated by switching between a built-in antenna and an outside antenna or between two built-in antennas for affording the transmitter/receiver apparatus with an antenna diversity function. This improves the reception performance of the transmitter/receiver apparatus.

Referring to FIG. 1, a transmitter/receiver apparatus 300 includes a built-in antenna 310, an outside antenna connection terminal 315 and a switch 320 for switching between antennas, not shown, connected to the built-in antenna 310 or to the outside antenna connection terminal 315. The transmitter/receiver apparatus 300 also includes an outside antenna connection detection circuit 316 for detecting the antenna connection state of the outside antenna connection terminal 315, and a switch controlling circuit 317 for controlling the switch 320 based upon a detection signal of the outside antenna connection detection circuit 316. The transmitter/receiver apparatus 300 also includes an input device 370 for inputting the speech or the like to the transmitter/receiver apparatus 300, and a transmitter 360 for converting the speech entered by the input device 370 into transmission signals. The transmitter/receiver apparatus 300 also includes a sole antenna multiplexor 330 for separating the transmission signals from the transmitter 360 from the reception signals from the switch 320, and a receiver 340 for converting the reception signals from the switch 320 into output signals. The transmitter/receiver apparatus 300 further includes an outputting device 350 for outputting an output signal of the receiver 340 as speech or the like and a terminal controller 380 for controlling the receiver 340 and the transmitter 360. The antenna duplex 330 is made up of a reception filter 331 and a transmission filter 332, each of which has arbitrary frequency response characteristics as later explained.

The above-described transmitter/receiver apparatus 300 transmits or receives signals by switching between a built-in antenna and an outside antenna. The switching operation is explained in detail.

If an outside antenna, not shown, is connected to the outside antenna connection terminal 315, the outside antenna connection detection circuit 316 detects whether or not the outside antenna is connected to the outside antenna connection terminal 315. That is, the outside antenna connection detection circuit 316 detects in this case that the outside antenna is connected to the outside antenna connection terminal 315. The switch controlling circuit 317 transmits to the switch 320 a control signal derived from the detection signal of the outside antenna connection detection circuit 316. The switch 320 is set to a terminal 322 towards the outside antenna connection terminal 315 by a control signal from the switch control circuit 317. Thus the transmission signal, obtained by the transmitter 360, is radiated via the outside antenna connection terminal 315 from the outside antenna. The reception signal is received by the outside antenna. If the outside antenna is not connected to the outside antenna connection terminal 315, the switch control circuit 317 transmits the control signal derived from the detection signal of the outside antenna connection detection circuit 316 to the switch 320, as in the case wherein the outside antenna is connected to the outside antenna connection terminal 315. The switch 320 is set to a terminal 321 towards the built-in antenna 310 by a control signal from the switch control circuit 317. Thus the transmission signal, obtained by the transmitter 360, is radiated via the built-in antenna. The reception signal is received by the built-in antenna 310.

By the above switching operation, the outside antenna or the built-in antenna 310 is selected by the switch 320, and transmission/reception is effectuated by the selected antenna.

The operation during transmission and reception is explained in detail.

During reception, the reception signals, received by the antenna selected by the above switching operation, are supplied to the antenna duplexer 330. The reception signals are supplied only to the receiver 340 by the antenna duplexer 330. The receiver 340 frequency-converts and demodulates the reception signals from the antenna duplexer 330, under control by the terminal controller 380, and outputs the processed reception signals by the outputting device 350. The outputting device 350 thus outputs the speech or the like.

During transmission, the speech or the like is entered by the input device 370. The input speech or the like is sent to the transmitter 360. The transmitter 360 modulates and frequency converts the speech or the like supplied thereto under control by the terminal controller 380 for generating transmission signals having a frequency employed in the present communication system and for supplying the transmission signal to the antenna duplexer 330. The transmission signals, obtained at the transmitter 360, are supplied only to the switch 320 by the antenna duplexer 330. The switch 320 effectuates the above-described switching operation for selecting the outside antenna or the built-in antenna 310. Thus the transmission signal outputted by the antenna duplexer 330 is radiated by the antenna selected by the switch 320.

Referring now to the transmission/reception frequency range of the transmitter/receiver apparatus 300, the frequency in a frequency range from $Fl_S$ to $Fh_R$ employed for communication is assigned so that the transmission frequency has a range from $Fl_S$ to $Fh_S$ and the reception frequency has a range from $Fl_R$ to $Fh_R$, as shown in FIG. 2. That is, the transmission frequency range $Fl_S$ to $Fh_S$ and the reception frequency range $Fl_R$ to $Fh_R$ are selected to be broader so that the frequency interval between transmission and reception $Fh_S$ and $Fl_R$ is narrower.

If the above transmitter/receiver 300 is used in, for example, a cellular telephone of the total access communication system (TACS) system or the licensed personal communication services (PCS), for which the frequency assignment is done in the United States, the frequency response required of the antenna multiplexer 330 is the transmission frequency range $F1_S$ to $Fh_S$ and the reception frequency range $F1_R$ to $Fh_R$ for the transmission filter 332 and for the reception filter 331, respectively, such that extremely acute shoulder characteristics are required.

On the other hand, if the above transmitter/receiver 300 is applied to a cellular of the TACS system, the switch 320 having an insertion loss on the order of 0.7 dB is routinely employed in the transmitter/receiver 300. The transmission filter 332 of the transmission duplexer 330 having an insertion loss on the order of 2.5 dB and the reception filter 331 of the antenna duplexer 330 having an insertion loss on the order of 4.0 dB are employed on the transmitter side and on the receiver side, respectively. Thus the insertion loss from the transmitter 360 to the built-in antenna 310 or the outside antenna connection terminal 315 is $$2.5 \; dB + 0.7 \; dB = 3.2 \; dB$$

while the insertion loss from the built-in antenna 310 or the outside antenna connection terminal 315 to the receiver 340 is $$0.7 \; dB + 4.0 \; dB = 4.7 \; dB$$

If the insertion loss of the antenna duplexer 330 is to be decreased, the antenna multiplexer 330 is increased in size, whereas, if the antenna duplexer 330 is to be reduced in size, the insertion loss of the antenna duplexer 330 is increased. On the other hand, if the insertion loss of the antenna duplexer 330 is increased and the antenna duplexer 330 is to be reduced in size, the result is the increased power consumption of the transmitter/receiver 300 and concomitant reduction in the usable time as well as heat evolution produced by the insertion loss and deterioration in reception sensitivity.

In a transmitter/receiver apparatus employed in two communication systems different only in the frequencies employed for communication, it is necessary to provide a switch for changeover of the frequency ranges to be in use and a switch for changeover of the antennas to be in use, with the result that the insertion loss of the transmitter/receiver apparatus is increased.

SUMMARY OF THE INVENTION

It is therefore an object of the present invention to provide a transmitter/receiver apparatus in which radio transmission and reception may be achieved in the frequency division multiplexing or time division multiplexing system in the frequency duplex system without deteriorating the reception sensitivity despite reduction in size and power consumption.

The transmitter/receiver apparatus for radio transmission/reception of frequency division duplexed reception and transmission signals according to the present invention includes a plurality of antennas for radio transmission/reception of the reception and transmission signals, switching means for switching between these antennas, a plurality of antenna duplexers connected to the antennas via the switching means and having respective different frequency bands, transmission means connected to the antenna duplexer reception means connected to the antenna duplexer, and control means for controlling the switching means, transmission means and the reception means. The control means controls the switching means so that an optional one of the antennas will be connected solely by the switching means to the antenna duplexer of the frequency band corresponding to the frequency used in radio communication. The control means controls the reception means during reception for receiving reception signals from the optional antenna via the antenna duplexers. The control means also controls the transmission means during transmission for transmitting transmission signals of the frequency used for radio transmission via the antenna duplexer from the optional antenna. By employing two antenna duplexer units, the frequency characteristics of the respective antenna duplexers may be relaxed, thus enabling insertion losses of the two antenna duplexers to be reduced. Since this allows to reduce the insertion losses from the input means to the antenna, an output power of the input means may be reduced and heat produced in the input means and in the antenna duplexers may be reduced. Since insertion losses from the antenna to the output means may be decreased, reception sensitivity may be improved and the size of the apparatus and power consumption may be decreased.

One of the two antennas is an outside connection antenna, so that a variety of antennas may be used.

The reception and transmission signals are time division multiplexed signals, thus enabling the signals to be transmitted and received over radio paths by time division multiplexing.

The reception means has measurement means for measuring the intensity of the reception signals received by radio reception. The control means controls the measurement means so that switching of the switching means and measurement by the measurement means will occur during vacant time slots of time division multiplexing. The control unit controls the switching means during the next reception based upon measured results of the measurement means. This enables reception sensitivity to be improved further and reduces the size of the apparatus and power consumption while maintaining the antenna diversity function without deteriorating transmission/reception performance.

In the transmitter/receiver apparatus according to the present invention, plural antennas receive and transmit frequency division duplexed reception signals and transmission signals over radio paths. The switching means select an optional one of the antennas, under control by control means, and connect the optional antenna with one of the antenna duplexer of a frequency band corresponding to the frequency used for radio communication. The transmission means transmit transmission signals of the frequency used for radio transmission/reception under control by the control means via the antenna duplexer from the optional antenna. The reception means receive reception signals under control by the control means via the antenna duplexer from the optional antenna. The control means controls the switching means so that an optional antenna will be connected via the switching means to the antenna duplexer of the frequency band corresponding to the frequency employed for radio transmission/reception. The control means controls the reception means during reception so that reception signals will be received via the antenna duplexer from the optional antenna, while controlling the transmission means during transmission so that transmission signals of the frequency used for radio transmission and reception will be transmitted via the antenna multiplexer from the optional antenna.

In the transmitter/receiver apparatus according to the present invention, one of the two antennas is an outside connection antenna.

In the transmitter/receiver apparatus according to the present invention, the reception and transmission signals are time division multiplexed signals.

Also, in the transmitter/receiver apparatus of the present invention, the measurement means of the reception means measures the intensity of the reception signals received by radio reception. The control means controls the measurement means so that switching of the switching means and measurement by the measurement means will occur during vacant time slots of time division multiplexing. The control means also controls the switching means during the next reception based upon measured results of the measurement means.

DESCRIPTION OF PREFERRED EMBODIMENTS

First, a transmitter/receiver apparatus according to a first embodiment of the present invention is explained.

Figure 3:
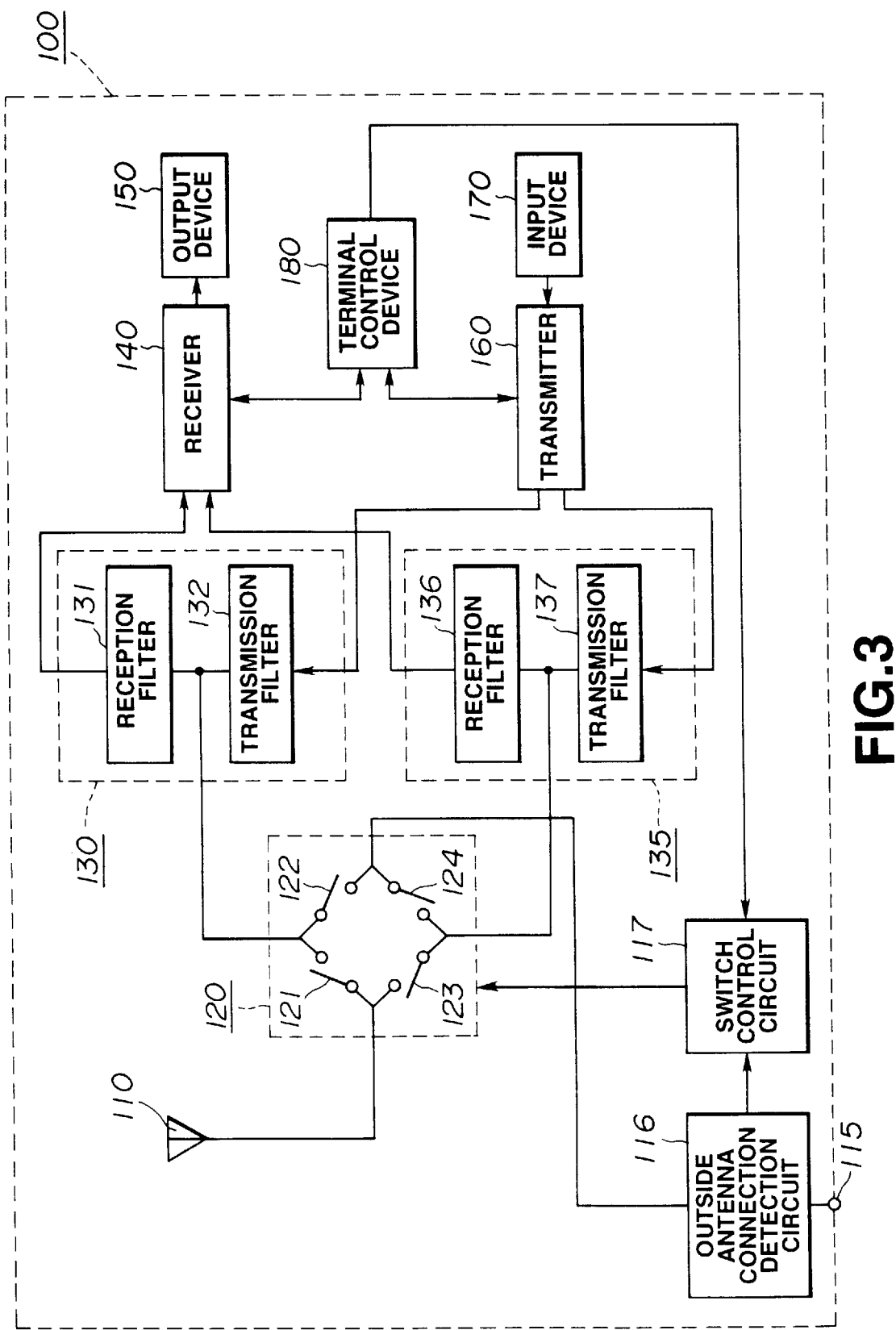
FIG. 3 is a block diagram showing an arrangement of a transmitter/receiver apparatus according to a first embodiment of the present invention.

The transmitter/receiver apparatus is a transmitter/receiver apparatus 100 employed as a terminal of a portable telephone handset of the frequency division duplex (FDD) system as shown in FIG. 3.

The transmitter/receiver apparatus 100 includes a built-in antenna 110, an outside antenna connection terminal 115 and an outside antenna connection detection circuit 116. The transmitter/receiver apparatus 100 also includes a switch control circuit 117 supplied with a detection signal of an outside antenna connection detection circuit 116, and a switch matrix 120 supplied with control signals of the switch control circuit 117. The transmitter/receiver apparatus 100 also includes a first antenna duplexer 130, a second antenna duplexer 135, a receiver 140 and a transmitter 160. The transmitter/receiver apparatus 100 further includes a terminal control device 180 for controlling the receiver 140, transmitter 160 and the switch control circuit 117, an output device 150 and an input device 170.

The switch matrix 120 has four contacts 121 to 124 and is connected to the built-in antenna 110, first antenna duplexer 130 and to the second antenna duplexer 130, while being connected via the outside antenna connection detection circuit 116 to the outside antenna connection terminal 115.

The first antenna duplexer 130 is made up of a reception filter 131 connected to the switch matrix 120 and a transmission filter 132 connected to the switch matrix 120 and the reception filter 131. The reception filter 131 and the transmission filter 132 are connected to the receiver 140 and to the transmitter 160, respectively.

The second antenna duplexer 135 is made up of a reception filter 136 connected to the switch matrix 120 and a transmission filter 137 connected to the switch matrix 120 and the reception filter 136. The reception filter 136 and the transmission filter 137 are connected to the receiver 140 and to the transmitter 160, respectively.

The receiver 140 and the transmitter 160 are connected to the output device and to the input device 170, respectively.

The frequency response bands of the two antenna duplexers, namely the first antenna duplexer 130 and the second antenna duplexer 135, are now explained. In the frequency range $F1_S$ to $Fh_R$ employed for communication by the transmitter/receiver apparatus 100, the transmission frequency has a frequency range from $F1_S$ to $Fh_S$, while the reception frequency has a frequency range from $F1_R$ to $Fh_R$. The transmission frequency range $F1_S$ to $Fh_S$ is divided into two equal portions, namely into a frequency range $F1_S$ to $Fc_S$ and a frequency range $Fc_S$ to $Fh_S$ and the reception frequency range $F1_R$ to $Fh_R$ is divided into two equal portions, namely into a frequency range $F1_R$ to $Fc_R$ and a frequency range $Fc_R$ to $Fh_R$.

In the first antenna duplexer 130, the frequency response band of the transmission filter 132 is the frequency band $F1_S$ to $Fc_S$, while the frequency response band of the reception filter 131 is the frequency response band $F1_R$ to $Fc_R$. In the second antenna duplexer 135, the frequency response band of the transmission filter 137 is the frequency band $Fc_S$ to $Fh_S$, while the frequency response band of the reception filter 131 is the frequency response band $Fc_R$ to $Fh_R$. The first antenna duplexer 130 or the second duplexer 135 outputs reception signals to the receiver 140 during reception, while transmitting transmission signals to the switch matrix 120 during transmission.

The above-described transmitter/receiver apparatus 100 effectuates transmission/reception by switching between the built-in antenna 110 or the outside antenna, not shown, and also by switching between the first antenna duplexer 130 and the second antenna duplexer 135 based upon the frequencies employed for communication. This switching operation is now explained in detail.

First, the outside antenna connection detection circuit 116 detects whether or not the outside antenna, not shown, is connected to the outside antenna connection terminal 115. The corresponding detection signal is transmitted to the switch control circuit 117.

The terminal control circuit 180 transmits a control signal having a frequency employed for communication to the switch control circuit 117.

The switch control circuit 117 generates a detection signal from the outside antenna connection detection circuit 116 and a switching control signal derived from the control signal from the terminal control device 180 and transmits the switching control signal to the switch matrix 120.

If, for example, the outside antenna, not shown, is connected to the outside antenna connection terminal 115, and communication is effectuated in the frequency band of the first antenna duplexer 130, the switch control circuit 117 generates a switching control signal for causing the contact 122 of the switch matrix 120 to be closed. By the switching control signal being supplied to the switch matrix 120, the outside antenna connection terminal 115 is connected with the first antenna duplexer 130 via the switch matrix 120. For assuring terminal impedance of the open contacts, it is possible for the switch control circuit 117 to generate a switching control signal which closes the contact 123 at the same time as the contact 122 is closed.

To the outside antenna connection terminal 115 is also connected an outside antenna, not shown. If communication is to be effectuated in the frequency band of the second antenna duplexer 135, the switch control circuit 117 generates a switching control signal which causes the contact 124 of the switch matrix 120 to be closed. By this switching control signal being supplied to the switch matrix 120, the outside antenna connection terminal 115 and the second antenna duplexer 135 are interconnected via the switch matrix 120. Meanwhile, for assuring terminal impedance of the open contacts, it is possible for the switch control circuit 117 to generate a switching control signal which closes the contact 121 at the same time as the contact 124 is closed.

If the outside antenna, not shown, is not connected to the outside antenna connection terminal 115 and communication is to be effected with the frequency band of the first antenna duplexer 130, the switch control circuit 117 generates a switching control signal that causes the contact 121 of the switch matrix 120 to be closed by this switching control signal being supplied to the switch matrix 120, the built-in antenna 110 and the first antenna duplexer 130 are interconnected via the switch matrix 120. Meanwhile, for assuring terminal impedance of the open contacts, it is possible for the switch control circuit 117 to generate a switching control signal that closes the contact 124 at the same time as the contact 121 is closed.

If the outside antenna, not shown, is not connected to the outside antenna connection terminal 115, and communication is to be effectuated with the frequency band of the second antenna duplexer 135, the switch control circuit 117 generates a switching control signal which causes the contact 123 of the switch matrix 120 to be closed. By this switching control signal being supplied to the switch matrix 120, the outside antenna 110 and the second antenna duplexer 135 are interconnected via the switch matrix 120. Meanwhile, for assuring terminal impedance of the open contacts, it is possible for the switch control circuit 117 to generate a switching control signal which closes the contact 122 at the same time as the contact 123 is closed.

The switch matrix 120 switches between four contacts 121 to 124, based upon switching control signals generated in the switch control circuit 117.

The transmission/reception operation in the transmitter/receiver apparatus 100 is explained in detail.

During transmission by the transmitter/receiver apparatus 100, the speech, for example, is entered to the transmitter receiver apparatus 100 via the input device 170. The speech entered by the input device 170 is supplied to the transmitter 160.

The terminal controller 180 sends a control signal having a frequency employed for communication to the transmitter 160.

The transmitter 160 modulates and frequency-converts the speech from the input device 170, based upon the control signal from the terminal controller 180, and transmits the generated RF transmission signal, having the frequency employed for communication, to one of the first antenna duplexers 130 and the second antenna duplexer 135.

The RF transmission signal, produced by the transmitter 160, is frequency-separated from reception signals by the antenna duplexers so as to be transmitted only to the switch matrix 120.

The switch matrix 120 effectuates the above-mentioned switching operation. Thus the RF transmission signals are radiated from the antenna selected by the switch matrix 120.

During reception by the transmitter-receiver apparatus 100, the switch matrix 120 selects, by the above switching operation, one of the built-in antenna 110 and the outside antenna, not shown, connected to the outside antenna connection terminal 115, while selecting, by the frequencies used for communication, one of the first antenna duplexer 130 and the second antenna duplexer 135. Thus the reception signal received by the antenna selected by the switch matrix 120 is supplied to the antenna duplexers selected by the switch matrix 120.

By the antenna duplexers, the reception signal is frequency-separated from the transmission signal so as to be supplied only to the receiver 140.

At this time, the terminal controller 180 transmits control signals having the frequencies used for communication. Thus the receiver 140 frequency converts and demodulates the reception signal from the antenna duplexers based upon the control signal from the terminal controller 180. The reception signal, thus processed, is outputted as speech by the output device 150.

Figure 4:
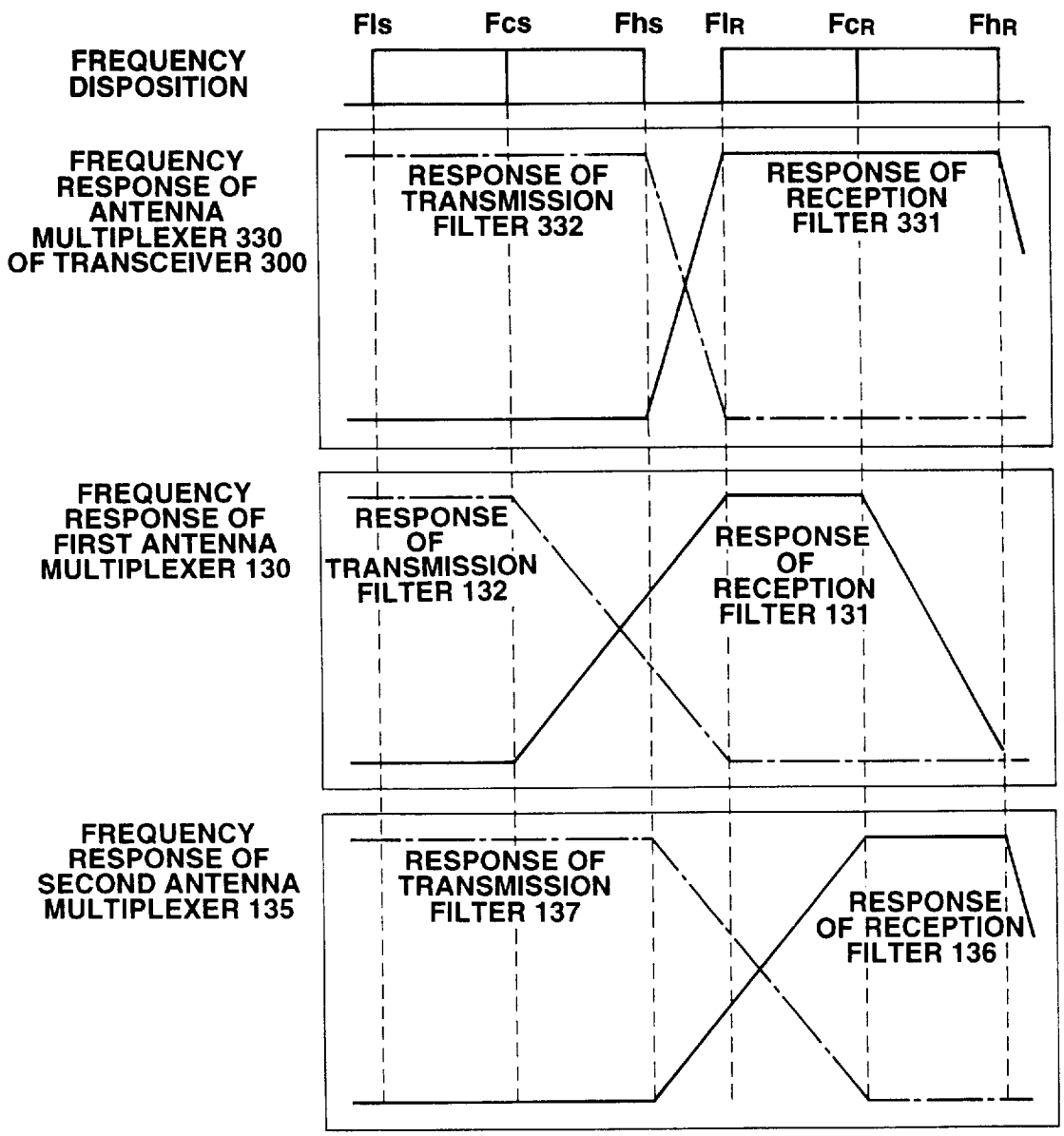
FIG. 4 illustrates the relation between the frequency used for communication and the frequency response band of the first and second antenna duplexer in the transmitter/receiver apparatus shown in FIG. 3.

With the present embodiment, two antenna duplexers, namely the first antenna duplexer 130 and the second antenna duplexer 135, are employed, and the first antenna duplexer 130 is of such frequency response characteristics as to cover the transmission frequency range from $F1_S$ to $Fc_S$ and the reception frequency range from $F1_R$ to $Fc_R$ while the second antenna duplexer 135 is of such frequency response characteristics as to cover the transmission frequency range from $Fc_S$ to $Fh_S$ and the reception frequency range from $Fc_R$ to $Fh_R$, as shown in FIG. 4. Thus the frequency characteristics shown in FIG. 4 may be narrower in pass-band and smoother in shoulder characteristics than the frequency characteristics obtained with the use of the sole antenna duplexer 330 shown in FIG. 1. This reduces insertion loss in the transmitter/receiver apparatus and the size of the apparatus.

If the transmitter-receiver apparatus 100 is employed in a cellular telephone of the TACS system, the switch matrix 120 of the transmitter-receiver apparatus 100 has an insertion loss on the order of 1.0 dB. As for the insertion losses of the first antenna duplexer 130 and the second antenna duplexer 135, the insertion losses on the transmitter and on the receiver are as low as approximately 1.5 dB and 2.5 dB, respectively, because of above-mentioned smooth shoulder characteristics. The insertion loss from the transmitter 160 to the built-in antenna 110 or to the outside connection antenna 115 is 1.5 dB+1.0 dB=2.5 dB, while the insertion loss from the built-in antenna 110 or the outside antenna connection terminal 115 to the receiver 140 is 1.0 dB+2.5 dB=3.5 dB.

Figure 1:
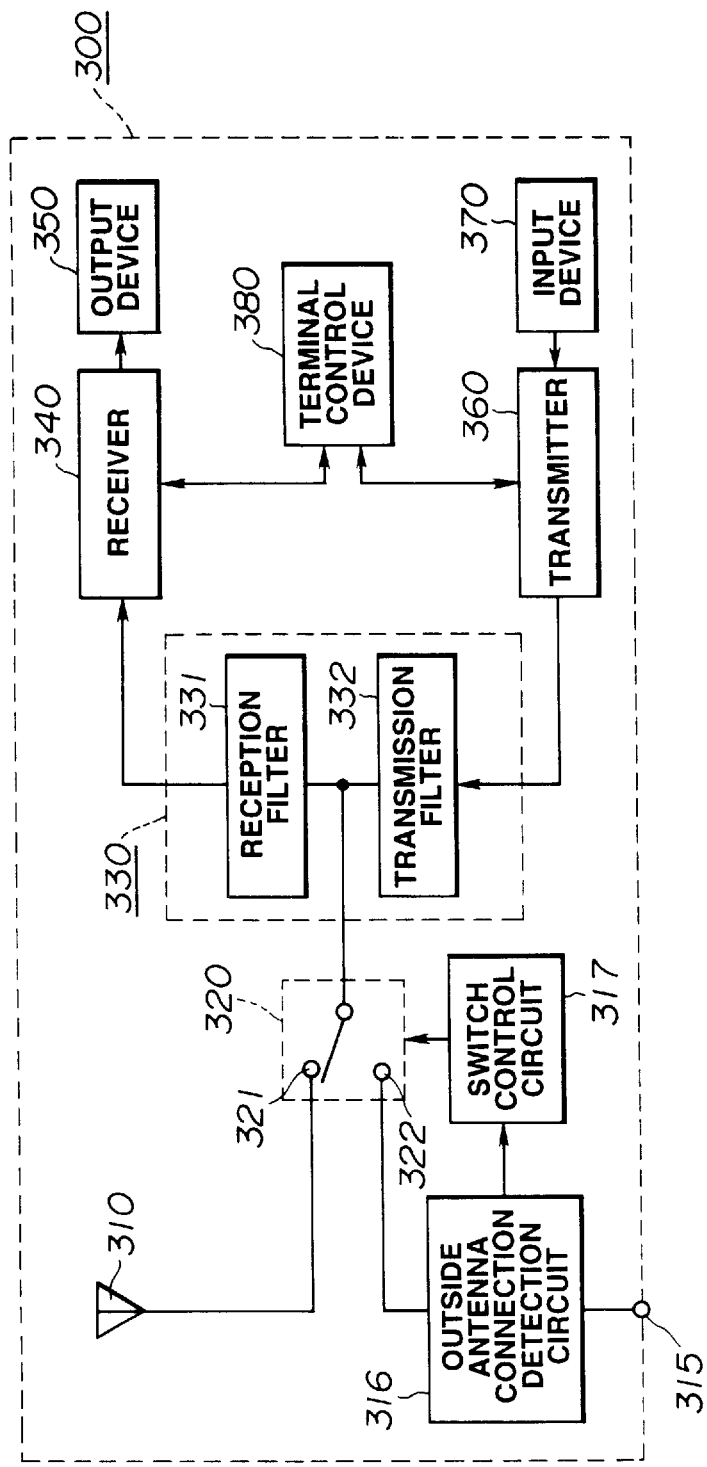
FIG. 1 is a block diagram showing an arrangement of a conventional transmitter/receiver apparatus.
Figure 2:
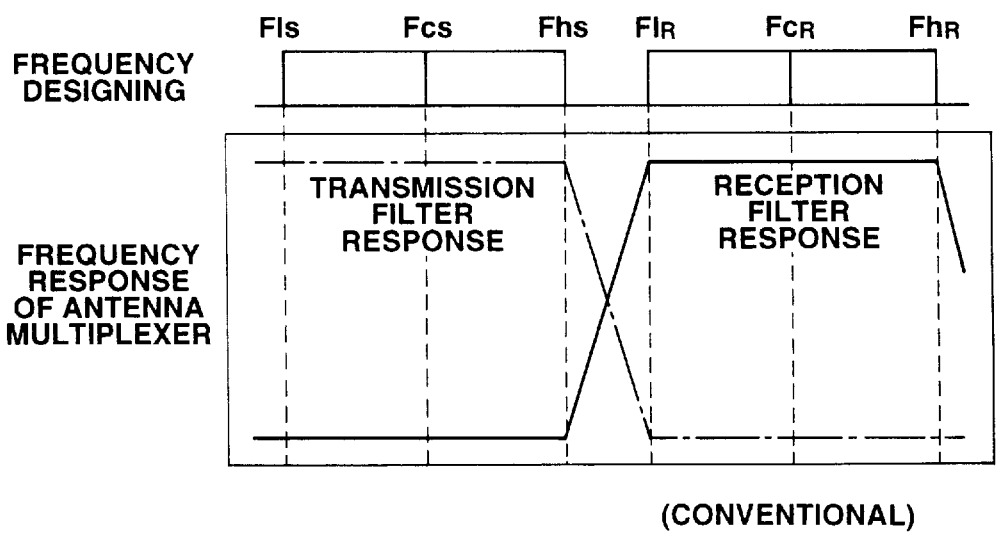
FIG. 2 illustrates the relation between the frequency employed for communication and the frequency response band in the transmitter/receiver apparatus shown in FIG. 1.

As for the insertion losses in case of employing a conventional transmitter/receiver apparatus, such as the transmitter-receiver apparatus 300 shown in FIG. 1, the insertion loss from the transmitter 360 to the built-in antenna 310 or the outside connection antenna 315 is 3.2 dB, while the insertion loss from the built-in antenna 310 or the outside antenna connection terminal 315 to the receiver 340 is 4.7 dB.

Comparing the insertion losses when the present invention to those of the conventional apparatus, the insertion loss in case of using the transmitter/receiver apparatus 100 of the present invention is clearly lower than those in case of using the transmitter-receiver apparatus 300.

Since the insertion losses from the transmitter 160 to the built-in antenna 110 or the outside antenna connection terminal 115 may be reduced in this manner, the output power of the transmitter 160 may be reduced. That is, since the power consumption may be decreased, the use time can be increased, such that heat produced in the transmitter 160, first antenna duplexer 130 and in the second antenna duplexer 135 may be reduced. On the other hand, since insertion losses from the built-in antenna 110 or the outside antenna connection terminal 115 to the receiver 140 may be reduced, reception sensitivity may be improved. In addition, since the frequency response characteristics required of the first antenna duplexer 130 and the second antenna duplexer 135 may be relaxed as compared to the case of employing the transmitter-receiver apparatus 300, the apparatus may be reduced in size.

By providing the outside antenna connection terminal 115, it becomes possible to employ a variety of antennas for transmission and reception.

A transmitter/receiver apparatus according to a modification of the present invention is now explained.

Figure 5:
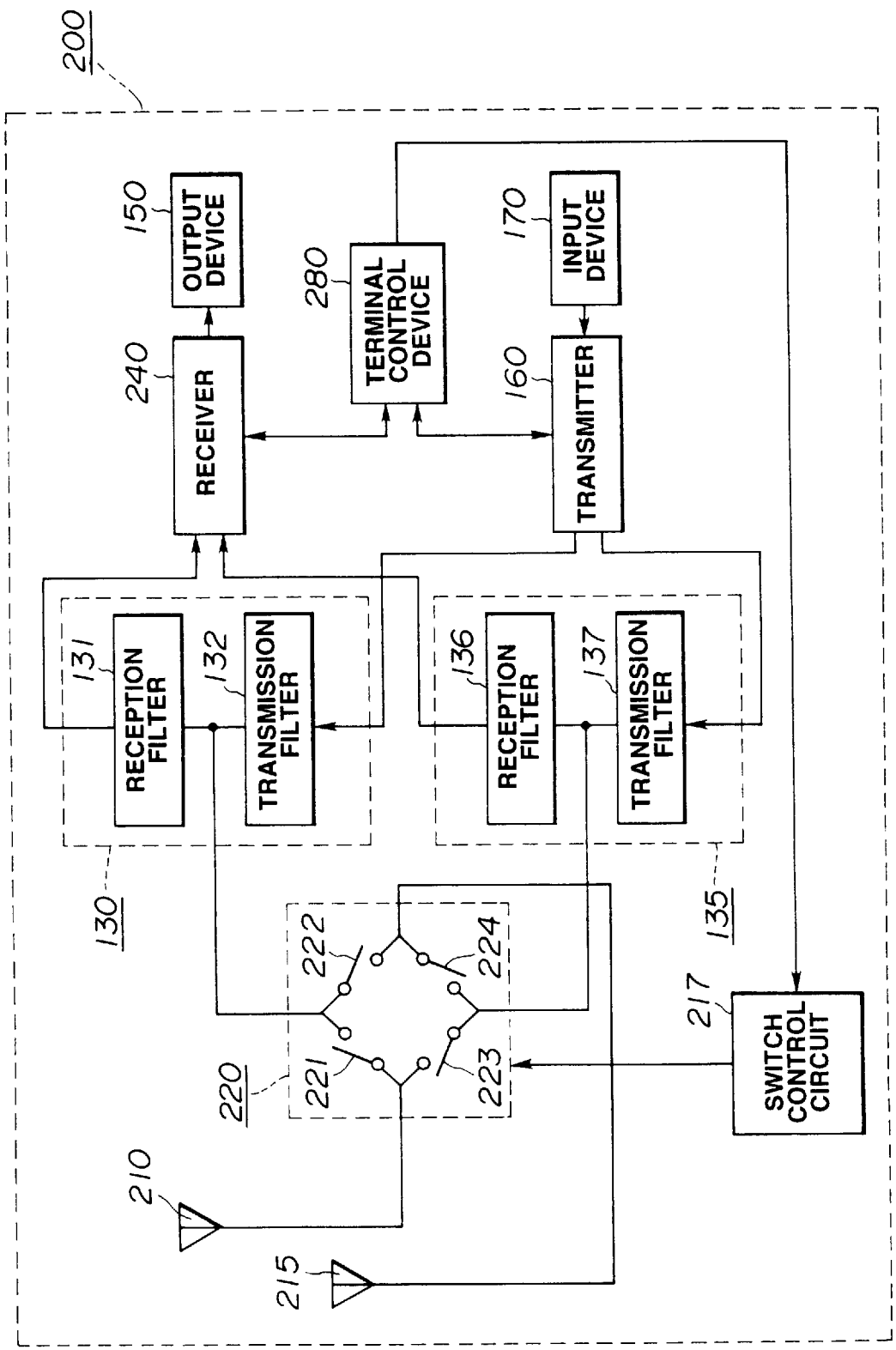
FIG. 5 is a block diagram showing an arrangement of a transmitter/receiver apparatus according to a second embodiment of the present invention.

The transmitter-receiver apparatus of the present modification is a transmitter-receiver apparatus 200 having an antenna diversity function and which may be used as a terminal of a portable telephone handset of the FDD and the TDM (time division multiplexing) system, as shown in FIG. 5.

The transmitter-receiver apparatus 200 is configured similarly to the transmitter-receiver apparatus 100 shown for example in FIG. 3, except that the outside antenna connection terminal 115 of the transmitter-receiver apparatus 100 is replaced by a second built-in antenna 215.

The portions operating similarly to the corresponding portions of the transmitter-receiver apparatus 100 are denoted by the same reference numerals and the detailed description is omitted for simplicity.

The transmitter-receiver apparatus 200 includes a first built-in antenna 210, a second built-in antenna 215 and a switch control circuit 217. The transmitter-receiver apparatus 200 also includes a switch matrix 220, supplied with a control signal from the switch control circuit 217, a first antenna duplexer 130, a second antenna duplexer 135, a receiver 240 and a transmitter 160. The transmitter-receiver apparatus 200 further includes a terminal controller 280 for controlling the transmitter 160 and the switch controlling circuit 217, an output device 150 and an input device 170.

The switch matrix 220 includes four contacts 221 to 224, and is connected to the first built-in antenna 215, first antenna duplexer 130 and to the second antenna duplexer 135.

The above-described transmitter/receiver apparatus 200 performs the following switching operations:

The terminal control device 280 first transmits the results of measurement from a measurement circuit of the receiver 240 and control signals having the frequencies employed for communication to the switch control circuit 217. The measurement circuit will be explained in detail subsequently.

The switch control circuit 217 generates a switching control signal, derived from the control signal from the terminal controller 280, and transmits the switching control signal to the switch matrix 220. The switch control circuit 217 transmits the generated switching control signal to the switch matrix 220 at a timing such that switching at the switching matrix 220 will take place in a vacant time slot of TDM. This prohibits antenna switching operations from being performed during the transmission time slot or reception time slot.

If the second built-in antenna 215 is selected by the control signal from the terminal controller 280, and the communication is to be performed within the frequency range of the first antenna duplexer 130, the switch controller 217 generates a changeover control signal which will cause the contact 222 of the switch matrix 220 to be closed. By this switching control signal being supplied to the switch matrix 220, the second built-in antenna 215 is connected via the switch matrix 220 to the first antenna duplexer 130. Meanwhile, for assuring terminal impedance of the open contacts, it is possible for the switch control circuit 217 to generate a switching control signal which closes the contact 223 at the same time as the contact 222 is closed.

If the second built-in antenna 215 is selected, and the communication is to be performed within the frequency range of the second antenna duplexer 135, the switch controller 217 generates a changeover control signal which will cause the contact 224 of the switch matrix 220 to be closed. By this switching control signal being supplied to the switch matrix 220, the second built-in antenna 215 is connected via the switch matrix 220 to the second antenna duplexer 135. Meanwhile, for assuring terminal impedance of the open contacts, it is possible for the switch control circuit 217 to generate a switching control signal which closes the contact 221 as the same time as the contact 224 is closed.

If the first built-in antenna 210 is selected, and the communication is to be performed within the frequency range of the first antenna duplexer 130, the switch controller 217 generates a changeover control signal which will cause the contact 221 of the switch matrix 220 to be closed. By this switching control signal being supplied to the switch matrix 220, the first built-in antenna 210 is connected via the switch matrix 220 to the first antenna duplexer 130. Meanwhile, for assuring terminal impedance of the open contacts, it is possible for the switch control circuit 217 to generate a switching control signal which closes the contact 221 at the same time as the contact 224 is closed.

If the first built-in antenna 210 is selected, and the communication is to be performed within the frequency range of the second antenna duplexer 135, the switch controller 217 generates a changeover control signal which will cause the contact 223 of the switch matrix 220 to be closed. By this switching control signal being supplied to the switch matrix 220, the first built-in antenna 210 is connected via the switch matrix 220 to the second antenna duplexer 135. Meanwhile, for assuring terminal impedance of the open contacts, it is possible for the switch control circuit 217 to generate a switching control signal which closes the contact 222 at the same time as the contact 223 is closed.

In the present embodiment, as described above, the switch matrix 220 switches between four contacts 221 to 224 in the vacant time slots of TDM based upon switching control signals from the switching control circuit 217.

That is, by the switching operation of the switch matrix 220, the reception signals, received by the selected antenna, are supplied to only the receiver 240 via the selected antenna duplexer. At this time, the terminal controller 280 transmits a control signal having the frequency employed for communication to the receiver 240. The receiver then frequency-converts and demodulates reception signals from the antenna duplexer based upon the control signal from the terminal controller 280.

The measurement circuit of the receiver 240 measures the strength of the reception signals from the antenna duplexer and transmits the results of measurement to the terminal controller 280. The terminal controller 280 judges, based upon the measured results from the measurement circuit, which of the reception signal from the first built-in antenna 210 or that from the second built-in antenna 215 is to be received in view of improving the network quality, and generates a control signal whereby the antenna judged to be superior is selected at the next reception slot and the transmission slot. The switch control signal 217 generates a switching control signal based upon the control signal generated by the terminal controller 280 as described above. Thus the switch matrix 220 performs the above-described switching operation based upon the switching control signal from the switch control circuit 217.

With the present embodiment, since the two antenna duplexers, namely the first antenna multiplexer 130 and the second antenna duplexer 135, are employed and are provided with the antenna diversity function, the reception performance can be improved further.

In addition, the insertion losses from the transmitter 160 to the first built-in antenna 210 or the second built-in antenna 215 may be diminished, as in the above-described first embodiment, while the antenna diversity function is provided, so that the insertion losses from the first built-in antenna 210 or the second built-in antenna 240 may be diminished. On the other hand, frequency characteristics required of the two antenna duplexers may be relaxed. The result is the reduction in power consumption and concomitantly increased use time as well as reduction in heat produce of the transmitter 160 and the two antenna duplexers, improved reception performance and reduction in size of the apparatus.

Although the transmission frequency band and the reception frequency band in the first antenna duplexer 130 and the second antenna duplexer 135 in the above-described first and second embodiments are each divided into two equal portions which are assigned to the frequency response bands of the transmission filter and the reception filter of each antenna duplexer, the transmission frequency band and the reception frequency band may also be divided into two bands of arbitrary bandwidths. The two bands resulting from division may be partially overlapped with each other.

Although the reception frequency band is higher than the transmission frequency band in each of the first and second embodiments, the transmission frequency band may be higher than the reception frequency band.

A transmitter/receiver apparatus according to a third embodiment of the present invention will be explained in detail.

Similarly to the above-described first embodiment, the transmitter/receiver apparatus may be applied to a transmitter/receiver apparatus employed as a terminal of the portable telephone handset terminal of the FDD system. The transmitter/receiver of the present embodiment is similar in construction to the transmitter-receiver apparatus 100 of the first embodiment shown in FIG. 3. The following explanation is made with reference to FIG. 3.

The transmitter/receiver apparatus of the present embodiment differs from the first embodiment as to the frequency covered by the apparatus, specifically, the frequency response bands of the first antenna duplexer 130 and the second antenna duplexer 135 and the frequency are a covered by the built-in antenna 110 and the outside antenna connected to the outside antenna connection terminal 115.

Since the present embodiment is similar to the transmitter/receiver apparatus of the first embodiment, the detailed description is omitted for simplicity.

In the present embodiment, the first antenna duplexer 130 and the second antenna duplexer 135 cover different frequency areas, while the two antennas, that is the built-in antenna 110 and the outside antenna connected to the outside antenna connection terminals 115, cover frequency areas of two systems different from each other only with respect to the frequencies used for communication.

Figure 6:
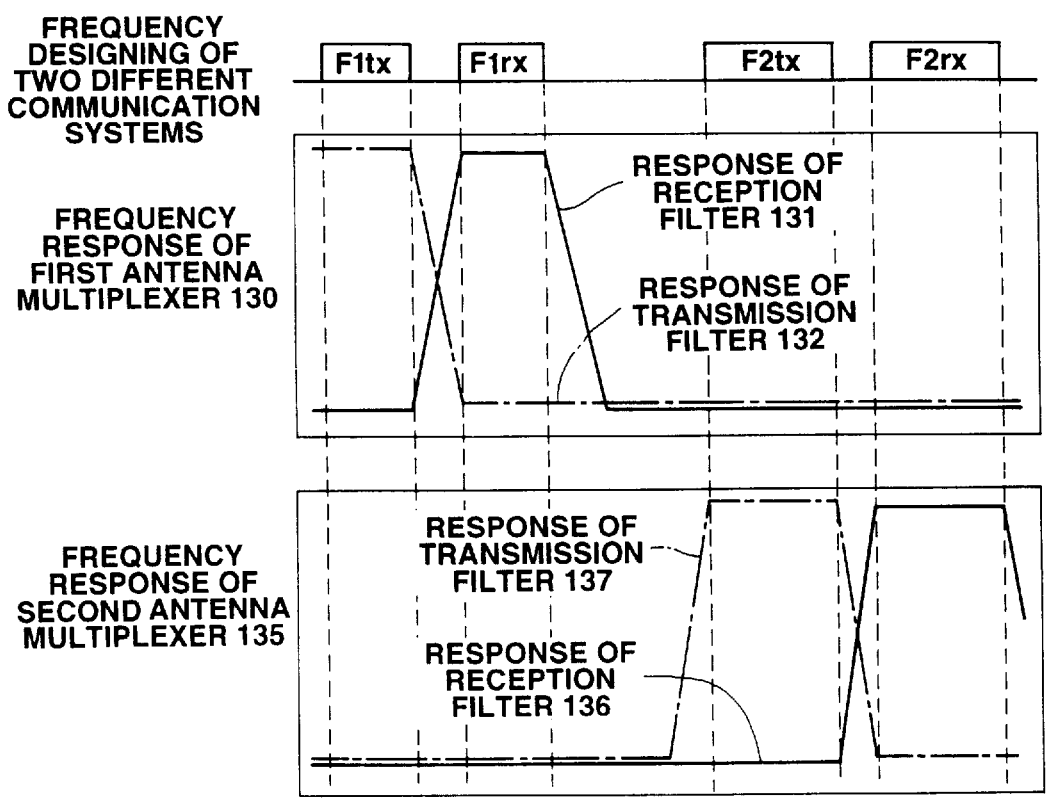
FIG. 6 illustrates the relation between two frequencies used for communication and the frequency response band of the first and second antenna duplexer in the transmitter/receiver apparatus shown in FIG. 3.

If, for example, the transmission frequency and the reception frequency in an arbitrary communication system are F1tx and F1rx, respectively, while the transmission frequency and the reception frequency in the other communication system are F2tx and F2rx, respectively, the first antenna duplexer 130 has such frequency response characteristics as to cover the frequency range of the arbitrary communication system and the second antenna duplexer 135 has such frequency response characteristics as to cover the frequency range of the other communication system, as shown in FIG. 6.

Specifically, the frequency response bands of the transmission filter 132 and that of the reception filter 131 in the first antenna duplexer 130 are F1tx and F1rx, respectively, whereas the frequency response bands of the transmission filter 137 and that of the reception filter 136 in the second antenna multiplexer 135 are F2tx and F2rx, respectively.

If the above-described transmission/reception apparatus is applied to a portable telephone handset terminal transmitting and receiving signals by two systems different only as to the frequencies used for communication, for example, a 800 MHz cellular and a 1.9 GHz band PCS in U.S.A., in the FDD communication system, it becomes possible for a sole transmitter/receiver apparatus to cope with the two systems that are different from each other only as to the frequencies used for communication, while the circuit scale is prohibited from being increased.

Since the frequencies used for communication and the antennas may be switched in the present embodiment by the sole switch matrix 120, insertion losses may be diminished.

Since the insertion losses from the transmitter 160 to the built-in antenna 110 or to the outside antenna connection terminal 115 may be reduced, the output power of the transmitter 160 may be reduced. That is, since power consumption may be reduced, the use time may be increased, while heat evolution in the transmitter 160, the first antenna duplexer 130 and in the second antenna multiplexer 135 may be reduced. In addition, since the insertion losses from the built-in antenna 110 or the outside antenna connection terminal 115 to the receiver 140 may be decreased, the reception sensitivity may be improved.

A transmitter/receiver according to a fourth embodiment of the present invention will be explained.

Similarly to the above-described second embodiment, the transmitter/receiver apparatus of the present embodiment is employed as a terminal of the portable telephone handset of the FDD system and the TDM system. The structure of the transmitter/receiver apparatus of the present embodiment is similar to that of the transmitter-receiver apparatus 200 shown in FIG. 5.

The following explanation is made with reference to FIG. 5.

The transmitter-receiver apparatus of the present embodiment differs from the transmitter-receiver apparatus of the second embodiment as to the frequency response bands of the first antenna duplexer 130 and the second antenna duplexer 135 and the built-in frequency area covered by the built-in antenna 210 and the antenna 215.

The present embodiment is otherwise similar to the second embodiment and hence detailed description is not made for brevity.

In the present embodiment, similarly to the above-described third embodiment, the first antenna duplexer 130 and the second antenna duplexer 135 cover different frequency bands, while the second built-in two antennas, namely the first built-in antenna 110 and the antenna 215, cover the frequency bands of two systems different from each other only with respect to the frequencies employed for communication.

If, for example, the transmission frequency and the reception frequency in an arbitrary communication system are F1tx and F1rx, respectively, while the transmission frequency and the reception frequency in the other arbitrary communication system are F2tx and F2rx, respectively, the first antenna duplexer 130 has such frequency response characteristics as to cover the frequency range of the arbitrary communication system and the second antenna duplexer 130 has such frequency response characteristics as to cover the frequency range of the other arbitrary communication system, as shown in FIG. 6.

Specifically, the frequency response bands of the transmission filter 132 and that of the reception filter 131 in the first antenna duplexer 130 are F1tx and F1rx, respectively, whereas the frequency response bands of the of the transmission filter 137 and that of the reception filter 136 in the second antenna duplexer 135 are F2tx and F2rx, respectively.

If the above-described transmission/reception apparatus is applied to, for example, a 800 MHz band cellular telephone and a 1.9 GHz band PCS, it becomes possible for a sole transmitter/receiver apparatus to cope with the two systems that are different from each other only as to the frequencies used for communication, while the circuit scale is prohibited from being increased.

Since the frequencies used for communication and the antennas may be switched in the present embodiment by the sole switch matrix 220, insertion losses may be diminished.

Since the insertion losses from the transmitter 160 to the first built-in antenna 210 or the second built-in antenna 215 may be reduced while the antenna diversity function is afforded, the output power of the transmitter 160 may be reduced. That is, since the power consumption may be decreased, the use time may be increased, while the heat produced in the transmitter 160, first antenna duplexer 130 or in the second antenna duplexer 135 may be decreased. In addition, since the insertion losses from the first built-in antenna 210 or the second built-in antenna 215 to the receiver 240 may be reduced, the reception sensitivity may be improved.

What is claimed is:

1. A transmitter/receiver apparatus for radio communication by transmission/reception of frequency division duplexed reception and transmission signals, comprising:

a plurality of antennas for radio transmission/reception of said reception and transmission signals;

a single switching matrix having a plurality of contacts for switching between said plurality of antennas;

a plurality of antenna duplexers, connected respectively to said plurality of antennas via said single switching matrix, each of said plurality of antenna duplexers having frequency bands that are respectively different from frequency bands of another of said plurality of antenna duplexers;

transmission means connected to said plurality of antenna duplexers;

reception means connected to said plurality of antenna duplexers; and control means for controlling said single switching matrix, said transmission means, and said reception means, wherein said control means controls said single switching matrix so that one of said plurality of antennas is connected solely by said single switching matrix to one of said plurality of antenna duplexers having a frequency band corresponding to a frequency used for said radio communication via one of said plurality of contacts, said control means controls said reception means for receiving signals from said one of said plurality of antennas via said one of said plurality of antenna duplexers, said control means controls said transmission means for transmitting transmission signals of said frequency used for said radio communication via said one of said plurality of antenna duplexers from said one of said plurality of antennas, and said control means controls said single switching matrix to close at least one other of said plurality of contacts not used for said radio communication to assure a terminal impedance of said single switching matrix.

2. The transmitter/receiver apparatus as claimed in claim 1, wherein said reception and transmission signals are time division multiplexed signals.

3. The transmitter/receiver apparatus as claimed in claim 2, wherein said reception means includes measurement means for measuring an intensity of signals received over a radio path, said control means controls said measurement means so that switching of said single switching matrix and measuring by said measurement means occurs during vacant time slots of a time division multiplexing operation, and said control means controls said single switching matrix during a next reception operation based upon measured results from said measurement means.

4. The transmitter/receiver apparatus as claimed in claim 1, wherein said single switching matrix effectuates both switching of a frequency used for said radio communication and switching between said plurality of antennas.

5. A transmitter/receiver apparatus for radio communication by transmission/reception of frequency division duplexed reception and transmission signals, comprising:

first and second antennas for radio transmission/reception of said reception and transmission signals;

a single switching matrix for switching between said first and second antennas, said single switching matrix having four contacts;

first and second antenna duplexer means connected respectively to said first and second antennas via said single switching matrix, said first antenna duplexer means having different frequency bands from frequency bands of said second antenna duplexer means;

transmission means connected to said first and second antenna duplexer means;

reception means connected to said first and second antenna duplexer means; and control means for controlling said single switching matrix, said transmission means, and said reception means, wherein said control means controls said single switching matrix so that one of said first and second antennas is connected solely by said single switching matrix to one of said first and second antenna duplexer means having a frequency band corresponding to a frequency used for said radio communication via one of said four contacts, said control means controls, during reception, said reception means for receiving reception signals via said one of said first and second antenna duplexer means from said one of said first and second antennas, said control means controls, during transmission, said transmission means for transmitting transmission signals of said frequency used for radio communication from said one of said first and second antennas via said one of said first and second antenna duplexer means, and said control means controls said single switching matrix to close another of said four contacts not used for said radio communication to assure a terminal impedance of said single switching matrix.

6. The transmitter/receiver apparatus as claimed in claim 5, wherein said second antenna is an outside connection antenna.

7. The transmitter/receiver apparatus as claimed in claim 5, wherein said single switching matrix is an RF switch matrix and operates to connect one of said first and second antennas with an associated one of said first and second antenna duplexer means in response to a switching control signal from said control means.

8. The transmitter/receiver apparatus as claimed in claim 7, wherein said control means simultaneously controls an on/off operation of said four contacts forming two paired switches of said RF switch matrix when said one of said first and second antennas and said associated one of said first and second antenna duplexer means are interconnected in response to said switching control signal from said control means so that said terminal impedance of vacant contacts of said RF switch matrix is controlled.

* * * * *